UNITED STATES PATENT OFFICE.

JOHN G. MEYERS, OF WASHINGTON, DISTRICT OF COLUMBIA.

ARTIFICIAL STONE.

SPECIFICATION forming part of Letters Patent No. 268,515, dated December 5, 1882.

Application filed October 17, 1882. (No specimens.)

*To all whom it may concern:*

Be it known that I, JOHN G. MEYERS, of Washington, in the District of Columbia, have invented certain Improvements in Artificial Stone, of which the following is a specification.

My invention relates to the manufacture of artificial stone, more especially designed for building purposes, though it may be used for other purposes also; and the invention consists in the combination of certain ingredients to form the stone, and in a novel method of arranging or applying the same, as hereinafter more fully set forth.

Artificial stone has long been made of a mixture of sand, gravel, and similar material with cement; but in making the same I have found two objections—viz., that it is subject to an efflorescence upon its surface after exposure for a time to the atmosphere, and is also subject to the absorption of moisture—both of which objections are serious drawbacks or hinderances to its general introduction and use.

The object of my present invention is to obviate these difficulties by the production of an artificial stone which shall be practically impervious to water or moisture, and upon the surface of which no efflorescence or discoloration shall occur.

To produce stone of this character I proceed as follows: I take good clean silicious sand, gravel, or rock of any suitable kind, crushed or broken into small fragments, so as to present a rough surface on the particles by destroying the natural or smooth surface of the stone, especially when using bowlders, pebbles, or similar smooth stone. Furnace-slag, broken brick, or any similar hard vitreous substance may be used in lieu of the broken stone, or in connection therewith, care being taken to break or crush it into small fragments, as above stated. Of these materials I take preferably of the broken stone or similar material, four parts; of sand, two parts, and of Portland cement, lime of Tiel, or any good strong cement, one part. To this I then add pulverized or finely-powdered alum, an amount equal to ten per cent. of the amount of cement used, and thoroughly mix the whole while dry. I then add the required quantity of water, in which there has been previously dissolved concentrated lye, in the proportion of two pounds to each barrel of cement used. The mass is thoroughly stirred and mixed, and is then placed in molds of the required size and shape, and after being well pressed or tamped therein it is removed from the mold and left until it has become well dried, when it is fit for use.

While the foregoing proportions are such as I propose to use ordinarily, it is obvious that they may be varied somewhat without materially alterating the nature or character of the stone. For instance, the proportions of sand and broken stone or similar material may be varied at will, or good sharp sand, or sand and gravel alone may be used. So, too, the proportions of alum and concentrated lye should be varied to correspond with the chemical qualities of the cement used, some cements containing more saltpeter than others, and when such are used the proportion of alum and lye should be increased accordingly.

Where it is desired to produce a cheaper quality of this stone—as, for instance, in the erection of farm buildings—instead of cement, a good strong lime may be used, preferably that made from oyster-shells and known as "shell lime." The refuse lime from gas-houses may also be used to advantage. Instead of mixing the alum and lye through the entire mass, it may be applied to the outer layer an inch or two thick only. In that case the interior portion will be composed of the broken material and sand mixed with the requisite amount of cement and water, while the outer portions will be composed of sand and cement having the alum and lye added, as above described, the material for the inner and outer portions being mixed separately, and so placed in the mold that the whole outer portion shall be composed of the mixture containing the alum and lye. In either case the chemical effect of the alum and lye is such as to entirely prevent any efflorescence or discoloration upon the exterior surface of the stone, and at the same time renders the stone much more impervious to moisture and harder. A similar effect may be produced by the use of ammonia in lieu of the alum and lye, and in that respect it may be considered as the equivalent of the latter; but as it is more expensive I prefer to use the alum and lye.

While I have described the stone as being made into blocks by the use of molds, it is obvious that walls may be laid up solid of it by using suitable frames to hold it in place until set, and building it up in courses, as is customary in the erection of the well-known "gravel" wall. By the addition of suitable coloring material, either to the mass or merely to the outer layer, any desired shade or color may be given to the blocks or wall thus made, and by having a variety of colors separately mixed with the material, and then properly arranging portions of them in the mold, a great variety of variegated, veined, or marbled styles of stone may be produced.

This stone is adapted to all the uses of ordinary stone and brick—such as buildings of all kinds, pavements, arches, bridges, walls, and the like—and may either be molded and laid with mortar or cement, like ordinary stone or brick, or it may be formed in place, as may be preferred.

Having thus fully described my invention, what I claim is—

1. An artificial stone composed of a mixture of sand or similar material, cement or lime, with the addition of alum and concentrated lye or their equivalent, substantially as described.

2. The use or addition in the manufacture of artificial stone of alum and lye or their equivalent, substantially as described, whether the same be incorporated through the entire mass or with the outer layer only, substantially as set forth.

JOHN G. MEYERS.

Witnesses:
H. A. HALL,
CHAS. CURTIN.